United States Patent
Plude et al.

(10) Patent No.: US 6,457,675 B1
(45) Date of Patent: Oct. 1, 2002

(54) HYDRAULIC ACTUATION SYSTEM FOR CARGO DOORS WITH CAM-TYPE LATCHES

(75) Inventors: Leo W. Plude, Woodinville, WA (US); Stephen A. Locantore, Long Beach, CA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 09/891,582

(22) Filed: Jun. 25, 2001

(51) Int. Cl.⁷ .................................................. B64C 1/14
(52) U.S. Cl. .................................... 244/129.5; 49/276
(58) Field of Search .................... 244/129.5, 129.4, 244/118.5; 49/276, 277, 278, 394

(56) References Cited

U.S. PATENT DOCUMENTS

| | | |
|---|---|---|
| 3,718,171 A | 2/1973 | Godwin |
| 4,473,201 A | 9/1984 | Barnes et al. |
| 4,680,891 A | 7/1987 | Perkins |
| 4,806,910 A | 2/1989 | Salzer |
| 4,994,722 A | 2/1991 | Dolan et al. |
| 5,163,639 A | 11/1992 | Herrmann et al. |
| 5,251,851 A | 10/1993 | Herrmann et al. |
| 5,381,065 A | 1/1995 | Jones |
| 5,735,487 A | 4/1998 | Abild et al. |
| 5,823,473 A | * 10/1998 | Odell et al. ............... 244/129.5 |
| 5,881,973 A | 3/1999 | Agajanian et al. |
| 6,158,692 A | 12/2000 | Abild et al. |

* cited by examiner

Primary Examiner—Peter M. Poon
Assistant Examiner—Timothy D. Collins
(74) Attorney, Agent, or Firm—Harness Dickey & Pierce P.L.C.

(57) ABSTRACT

A door actuation system for an outwardly opening aircraft door for use in an aircraft having a door opening, a cam post, and a plurality of latch pins. The door actuation system includes a locking mechanism operably coupled to the door, wherein the locking mechanism is positionable in a locked position preventing the door from being opened and an unlocked position. The system further includes a pull-in mechanism that is hydraulically actuated and includes a cam slot member capable of operably engaging the cam post of the aircraft. The pull-in mechanism is positionable in an uncammed position and a cammed position. A latching mechanism is also provided that is hydraulically actuated and includes a plurality of cam latches each capable of operably receiving one of the plurality of latch pins. The latching mechanism is positionable in a latched position and an unlatched position. The pull-in mechanism and the latching mechanism are capable of preventing opening of the door when the pull-in mechanism is in the cammed position and the latching mechanism is in the latched position, even if the locking mechanism is in the unlocked position.

10 Claims, 11 Drawing Sheets

HYDRAULIC ACTUATION SYSTEM FOR CARGO DOORS WITH CAM-TYPE LATCHES

FIELD OF THE INVENTION

The present invention generally relates to aircraft cargo doors and, more particularly, relates to a hydraulic actuation system for use with an aircraft cargo door that employs cam-type latches and prevent opening of the aircraft cargo door even if the cargo door is not fully locked.

BACKGROUND OF THE INVENTION

As is well known in the art, modern aircraft are often manufactured such that a single airframe design may be offered in a number of different configurations, such as a passenger transporting configuration, a freight transporting configuration, or a convertible configuration capable of being converted between the passenger transporting configuration and the freight transporting configuration in a relatively short period of time. To facilitate the loading and unloading of freight on these aircraft, large cargo doors are pivotally coupled to the fuselage of the aircraft to selectively reveal a body cutout or cargo opening therethrough. Typically, these cargo doors are automatically actuated between a closed position and an opened position using either a hydraulic actuation mechanism or an electromechanical actuation mechanism. Generally, electromechanical actuation mechanisms require additional space within the cargo door relative to hydraulic actuation mechanisms.

Due to the size of these cargo doors, they are often provided as outwardly opening panels, as opposed to inwardly opening, plug-type doors often used for passenger doorways. Unfortunately, there have been occurrences in commercial aviation history where outwardly opening cargo doors that were in a closed position, yet not latched or locked, have been inadvertently forced open during flight due to the aerodynamic lifting forces acting on the door. As a result of the size of the cargo door and cargo opening relative to the control surfaces of the aircraft, such inadvertent opening of the cargo door could adversely effect the ability of the flight crew to control the aircraft.

Presently, there are basically two types of outwardly opening cargo doors in service. The first type of outwardly opening cargo door employs hook-type latches to retain the cargo door in a closed position relative to the cargo opening. These hook-type latches function to simultaneously pull the cargo door into the cargo opening and latch or lock the cargo door in this closed position, such as those employed on the Boeing 737-200C, Boeing DC/MD series cargo doors, and many of the cargo doors on Airbus aircraft.

The second type of outwardly opening cargo doors employs cam-type latches to retain the cargo door in the closed position. These cam-type latches utilize a separate mechanism to first pull the door into the cargo opening before the cam-type latches latch or lock the cargo door in the closed position. Examples of this type of cargo door may be seen on the Boeing 707, 727, 747, 757, 767, and 777.

Attempts have been made to prevent the inadvertent opening of the cargo door by utilizing an electromechanical actuation mechanism in conjunction with these cam-type latches. To this end, the motor brake of the rotary motor of the electromechanically actuated mechanism serves to mechanically resist movement of the pull-in mechanism of the cam-type latch. By resisting movement of the pull-in mechanism, the cargo door is retained in a semi-closed position, even if the cargo door is not fully latched and locked. However, there are disadvantages associated with this feature. For example, as noted above, electromechanical actuation mechanism require additional space allocation within the cargo door relative to hydraulic actuation mechanisms. Many new aircraft have a reduced cargo door frame depth which will not accommodate such electromechanical actuation mechanisms. Furthermore, many existing aircraft already employ hydraulic actuation mechanisms, which would be difficult and cost-prohibitive to retrofit.

Specifically, the sequencing of the various functions to achieve closing, latching, and locking of the cargo door with a hydraulic actuation mechanism is extremely complex and increases the likelihood of hydraulic leaks developing. That is, hydraulically actuated cargo door having cam-type latches have employed a combination of priority valves, mechanically operated valves, and relief valves. The use of priority valves has been problematic in service because any change in actuation timing caused by deflection of the cargo door linkage can result in mis-sequencing and damage to the cargo door. Such cargo door linkage deflection may be caused from such things as cargo loads and/or friction in the system.

Accordingly, there exists a need in the relevant art to provide a hydraulically actuated cargo door mechanism that utilizes cam-type latches that is capable of retaining the cargo door in a semi-closed position. Furthermore, there exists a need in the relevant art to provide a hydraulically actuated cargo door mechanism that is simple in construction so as to minimize the adverse effect in actuation timing caused by the use of priority valves. Still further, there exists a need in the relevant art to provide a hydraulically actuated cargo door mechanism that overcomes the disadvantages of the prior art.

SUMMARY OF THE INVENTION

According to the principles of the present invention, a door actuation system is provided having an advantageous construction. The door actuation system is employed in an outwardly opening aircraft door for use in an aircraft having a door opening, a cam post, and a plurality of latch pins. The door actuation system includes a locking mechanism operably coupled to the door, wherein the locking mechanism is positionable in a locked position preventing the door from being opened and an unlocked position. The system further includes a pull-in mechanism that is hydraulically actuated and includes a cam slot member capable of operably engaging the cam post of the aircraft. The pull-in mechanism is positionable in an uncammed position and a cammed position. A latching mechanism is also provided that is hydraulically actuated and includes a plurality of cam latches each capable of operably receiving one of the plurality of latch pins. The latching mechanism is positionable in a latched position and an unlatched position. The pull-in mechanism and the latching mechanism are capable of preventing opening of the door when the pull-in mechanism is in the cammed position and the latching mechanism is in the latched position, even if the locking mechanism is in the unlocked position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. For example, the cargo door actuation system of the present invention may find utility in a wide range of applications, such as in use with a cargo aircraft, a convertible aircraft, and the like. Although the following description is directed to the cargo door actuation system as it is used in a conventional, convertible, large-capacity, commercial airliner, the cargo door actuation system should not be construed to be limited to such applications.

Briefly, according to the principles of the present invention, a cargo door actuation system 10 is provided that electrically controls and hydraulically actuates an outwardly opening, non-plug type cargo door. This cargo door rotates about a piano-type hinge along the upper edge. To facilitate a pull-in operation, there are two independent pull-in mechanisms located at the lower corners of the cargo door. A latching mechanism is located along a bottom edge of the cargo door. The cargo door is actuated with hydraulic power supplied by the airliner's "A" hydraulic system. A single lift actuator located at the upper aft edge of the door opening performs opening and closing of the cargo door. Two independently operated pull-in actuators drive two pull-in hooks to pull-in the cargo door and initially hold the cargo door in the closed position. A latching mechanism then drives dual latch cams to latch the cargo door. Three mechanically operated check valves perform hydraulic pressure sequencing for the actuators of the various mechanisms to ensure proper operation sequencing. During opening, one check valve permits the latch actuator to unlatch the cargo door before the pull-in actuators and lift actuator proceed to open the cargo door. During closing, the other two check valves allow the pull-in actuator mechanisms to close the cargo door before the latch actuator proceeds to latch the cargo door.

Figure 1:
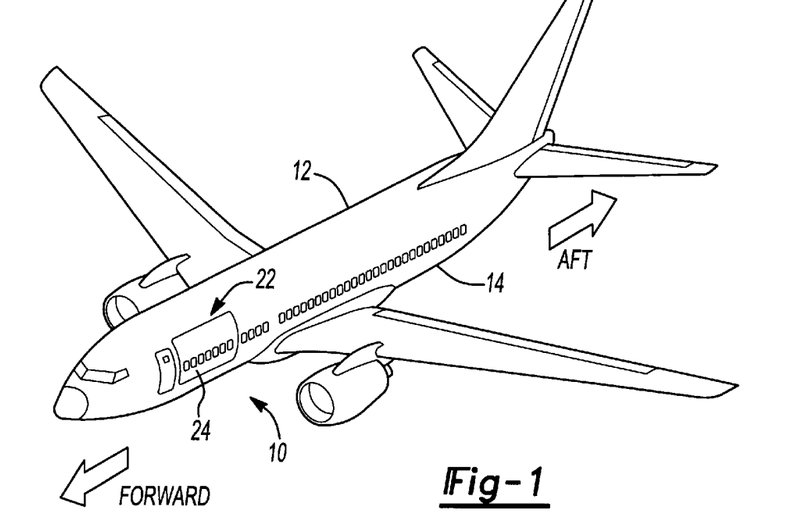
FIG. 1 is a perspective view. of an airliner incorporating a door actuation system according to the principles of the present invention.
Figure 2:
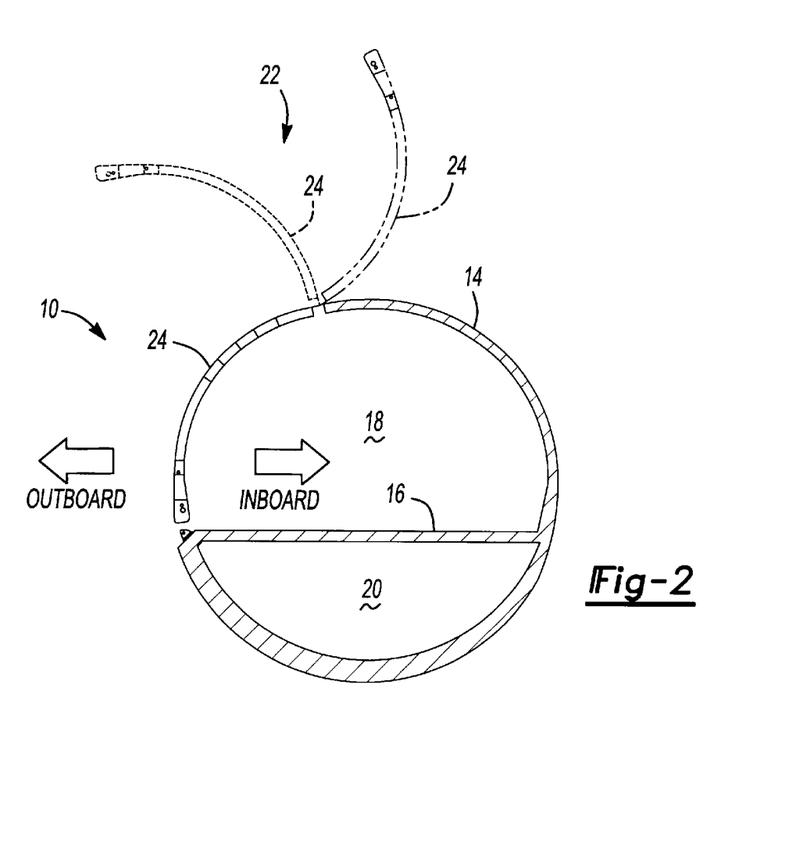
FIG. 2 is a cross-sectional view of the airliner illustrating a cargo door in a closed position, a canopy position, and a fully open position.

Referring to the figures, cargo door actuation system 10 is shown in a conventional, convertible, large-capacity, commercial airliner 12. As best seen in FIG. 2, airliner 12 includes a fuselage 14 that is divided by a horizontal transverse deck 16 into an upper section 18 and a lower section 20. Typically, lower section 20 contains the baggage hold and upper section 18 contains the passenger cabin, the cockpit of the aircraft, galleys, lavatories, and storage areas for carryon baggage. However, according to the present embodiment, upper section 18 may be converted to accommodate large freight pallets when airliner 12 is converted into a cargo-carrying mode. In order to facilitate the loading and unloading of these large freight pallets, a cargo door system 22 is provided.

Cargo door system 22 includes an outwardly opening cargo door 24 pivotally coupled to fuselage 14 along a top edge thereof via a piano-type hinge. Briefly, as seen in FIG. 2, cargo door 24 is operable to open to two positions: canopy position, wherein cargo door 24 is generally outright thereby providing an overhang over the door opening, and a fully opened position, wherein cargo door 24 is substantially vertical to maximize the cargo opening. However, cargo door 24 may be hydraulically locked at any position up to the fully opened position. Cargo door 24 maintains the airplane aerodynamic contour when cargo door 24 is closed, latched, and locked. Pressure seals around the door structure seal all gaps between cargo door 24 and fuselage 14 and allow cabin pressurization.

Figure 4A:
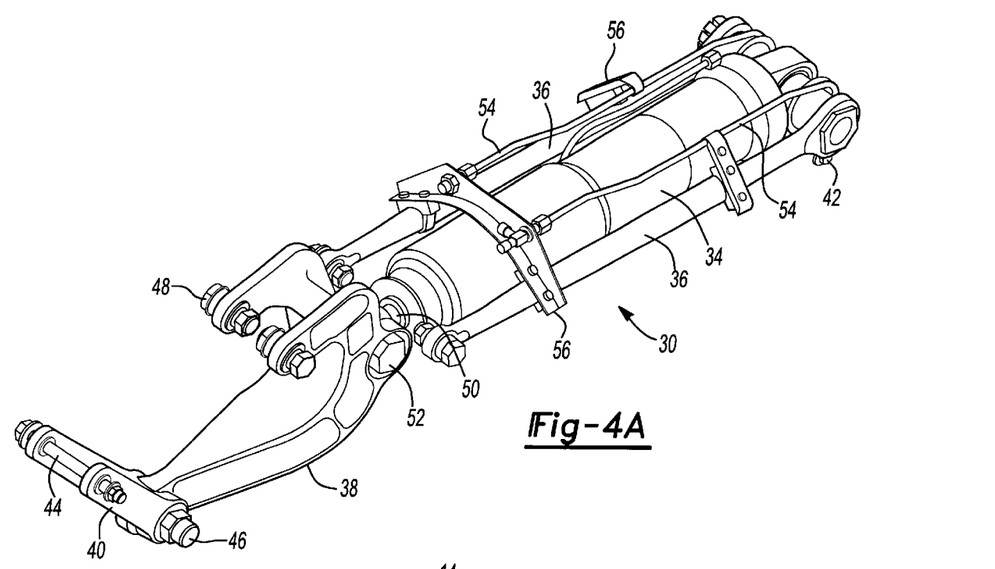
FIG. 4a is a perspective view illustrating a lift mechanism of the present invention.
Figure 4B:
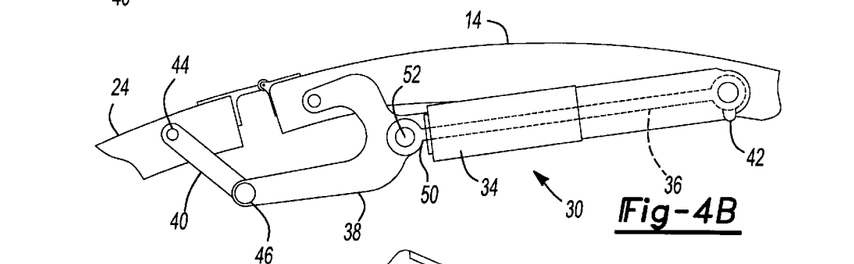
FIG. 4b is a side view illustrating the lift mechanism of the present invention.
Figure 4C:
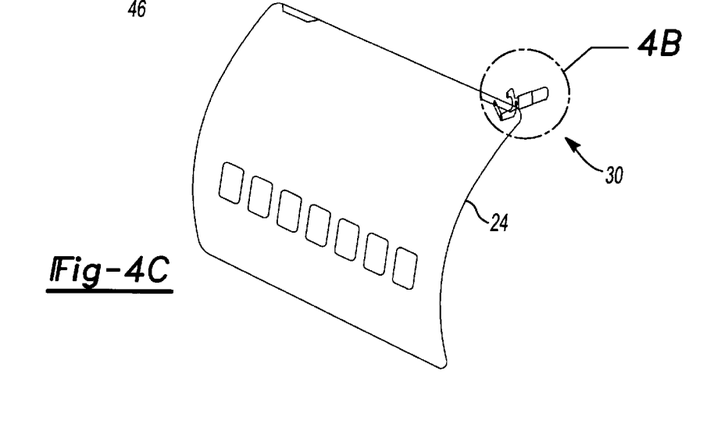
FIG. 4c is a perspective view illustrating the location of the lift mechanism.

Cargo door system 22 further includes a latching mechanism 26 generally centrally located on cargo door 24, a pair of pull-in mechanisms 28 located along the forward and aft edges of cargo door 24, and a single lift actuator mechanism 30 located in fuselage 14 near the upper aft corner of cargo door 24 (see FIG. 4c). Hydraulic power in the form of pressurized hydraulic fluid is supplied by the aircraft hydraulic system (not shown). However, cargo door 24 may be opened using a manual pump 32, which supplies pressurized hydraulic fluid for the actuators.

Figure 3:
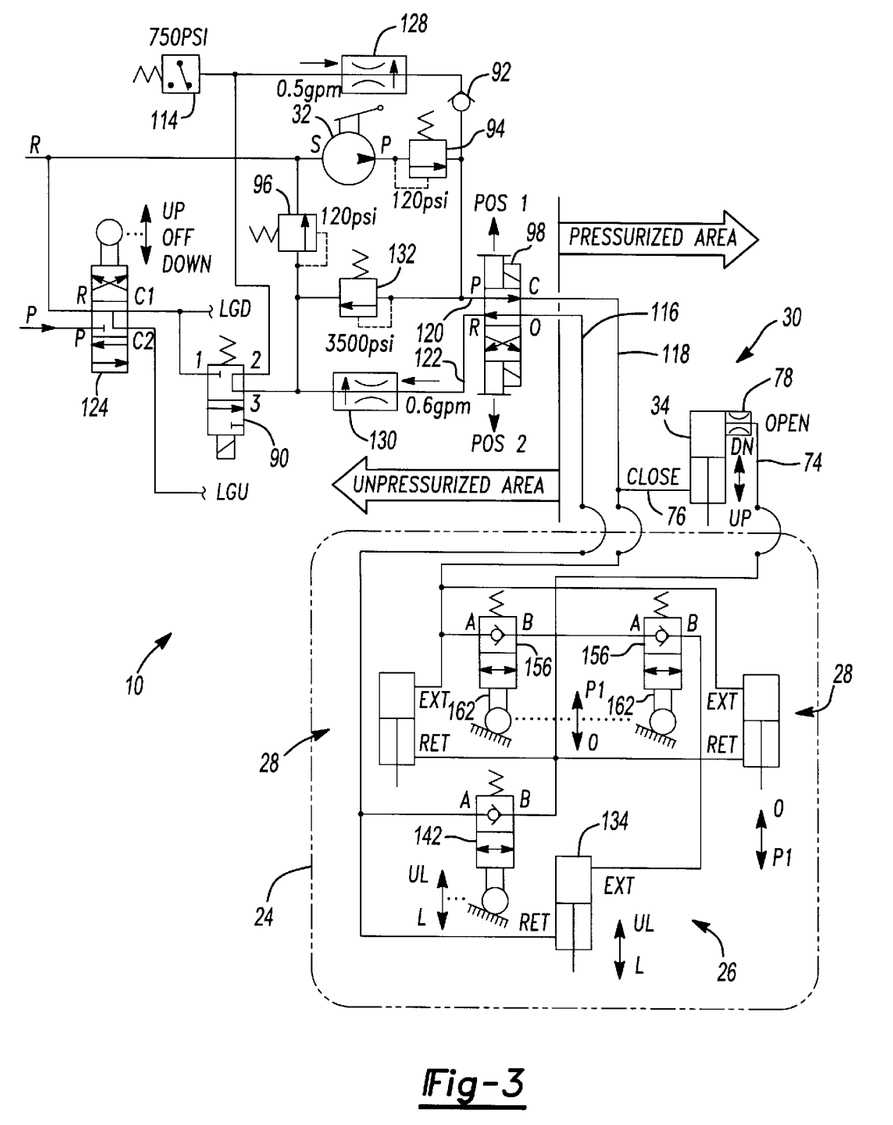
FIG. 3 is a fluid circuit diagram illustrating the door actuation system of the present invention.

Specifically, as seen in FIG. 3, manual pump 32, also known as a hand pump, is a single piston type pump, which can be used to supply hydraulic pressure to cargo door 24, if system hydraulic pressure is not available. Manual pump 32 has two ports, supply (generally indicated at "S") and pressure (generally indicated at "P"), and a sleeve for installation of a removable handle. During operation, cargo door actuation system 10 may be actuated in response to actuation of manual pump 32 and control of a control valve 98 into either POS 1 or POS 2.

Lift Actuator Assembly

Figure 5:
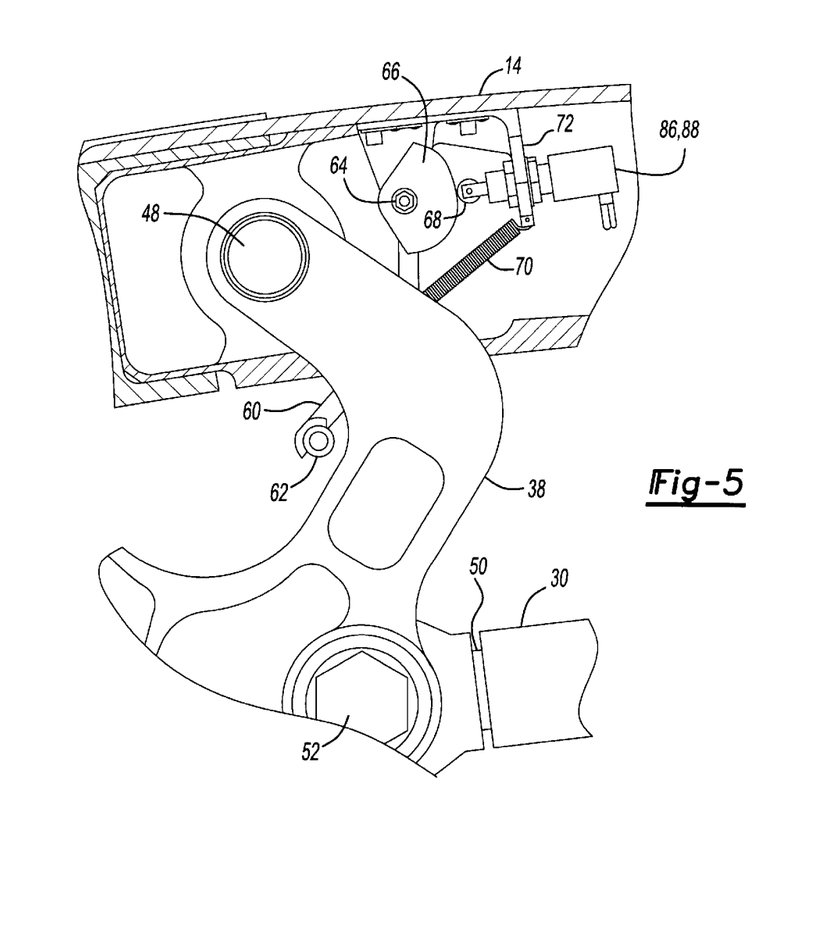
FIG. 5 is a side view illustrating a cargo door canopy switch.

Lift actuator mechanism 30 generally provides the means for opening or closing cargo door 24. As best seen in FIGS. 4*a*, 4*b*, and 5, lift actuator mechanism 30 includes a hydraulic actuator 34, a pair of reaction rods 36, a bell crank 38, a lift link 40, and a pair of reaction links 42. As seen in FIG. 4*b*, lift link 40 is pivotally coupled to cargo door 24 at pivot 44 and pivotally coupled to bell crank 38 at pivot 46. Similarly, bell crank 38 is pivotally coupled to fuselage 14 at pivot 48. An output shaft 50 of hydraulic actuator 34 is pivotally coupled to a midpoint of bell crank 38 at pivot 52. Accordingly, actuation of hydraulic actuator 34 causes bell crank 38 to pivot about pivot 48, thereby driving lift link 40 and cargo door 24 upward and outward. Similarly, retraction of output shaft 50 of hydraulic actuator 34 retracts bell crank 38, thereby retracting lift link 40 and cargo door 24.

Hydraulic actuator 34 is an unbalanced, linear actuator, which extends to open cargo door 24 to two positions (canopy and full open) and retracts to close cargo door 24. The inboard end of hydraulic actuator 34 is coupled to the pair of reaction rods 36 such that any loads within lift actuator mechanism 30 are transmitted back to fuselage 14. To this end, the pair of reaction links 42 supports the inboard end of hydraulic actuator 34 and the pair of reaction rods 36. The pair of reaction links 42 are each bolted to fuselage 14. The attachment of the pair of reaction links 42 and outboard ends of the pair of reaction rods 36 to fuselage 14 prevents or at least minimizes motion of the inboard end of the pair of reaction rods 36 and the inboard end of hydraulic actuator 34.

Hydraulic tubing 54, which is used to actuate hydraulic actuator 34, is coiled about reaction link 42 to permit flexing of hydraulic tubing 54 as cargo door 24 is actuated. Hydraulic tubing 54 is also supported with a plurality of clamps 56, which are connected to the pair of reaction rods 36.

As best seen in FIG. 5, a pair of canopy position switches 58 are provided adjacent to pivot 48 between bell crank 38 and fuselage 14. A cam arm 60 operates the pair of canopy positions switches 58 by the movement of bell crank 38. That is, once cargo door 24 opens approximately 880 or more, bell crank 38 engages a cam roller 62 disposed at the end of cam arm 60 such that further opening of cargo door 24 causes cam arm 60 to rotate about a pivot 64. Rotation of cam arm 60 about pivot 64 further rotates a cam member 66, which drives a plunger 68 of the pair of canopy position switches 58. A spring 70, which is coupled between a mounting bracket 72 and cam arm 60, maintains engagement of cam roller 62 with bell crank 38 once cargo door 24 has opened approximately 88° or more.

Figure 4D:
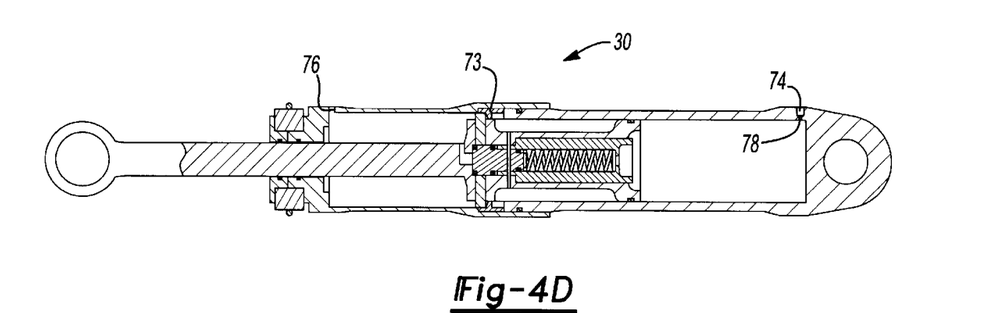
FIG. 4d is a cross-sectional view illustrating the lifting actuator.

As best seen in FIG. 4*d*, lift actuator mechanism 30 further includes a ram lock assembly 73. Lift actuator mechanism 30 is actuated when hydraulic pressure is supplied to an open port 74 (generally indicated as "open" in FIG. 2) or a closed port 76 (generally shown as "close" in FIG. 2). If hydraulic pressure is lost while cargo door 24 is above the canopy position, the internal mechanical ram lock 73 of lift actuator mechanism 30 prevents inadvertent or accidental lowering of cargo door 24. Ram lock 73 mechanically locks cargo door 24 in a position slightly below the canopy position. Cargo door 24 is lowered below the canopy position after hydraulic pressure applied to closed port 76 of lift actuator mechanism 30 is sensed by the pressure differential assembly of the internal ram lock 73. This pressure differential assembly releases ram lock 73 and allows cargo door 24 to be lowered when a pressure differential of 300 to 900 psi is present. A restrictor 78 disposed in open port 74 of lift actuator mechanism 30 controls the rate that cargo door 24 closes in the event of hydraulic line rupture. Restrictor 78 of lift actuator mechanism 30 provides the proper timing between lift actuator mechanism 30 and pull-in actuators 154 during operation.

Electrical Control Panel

Figure 6:
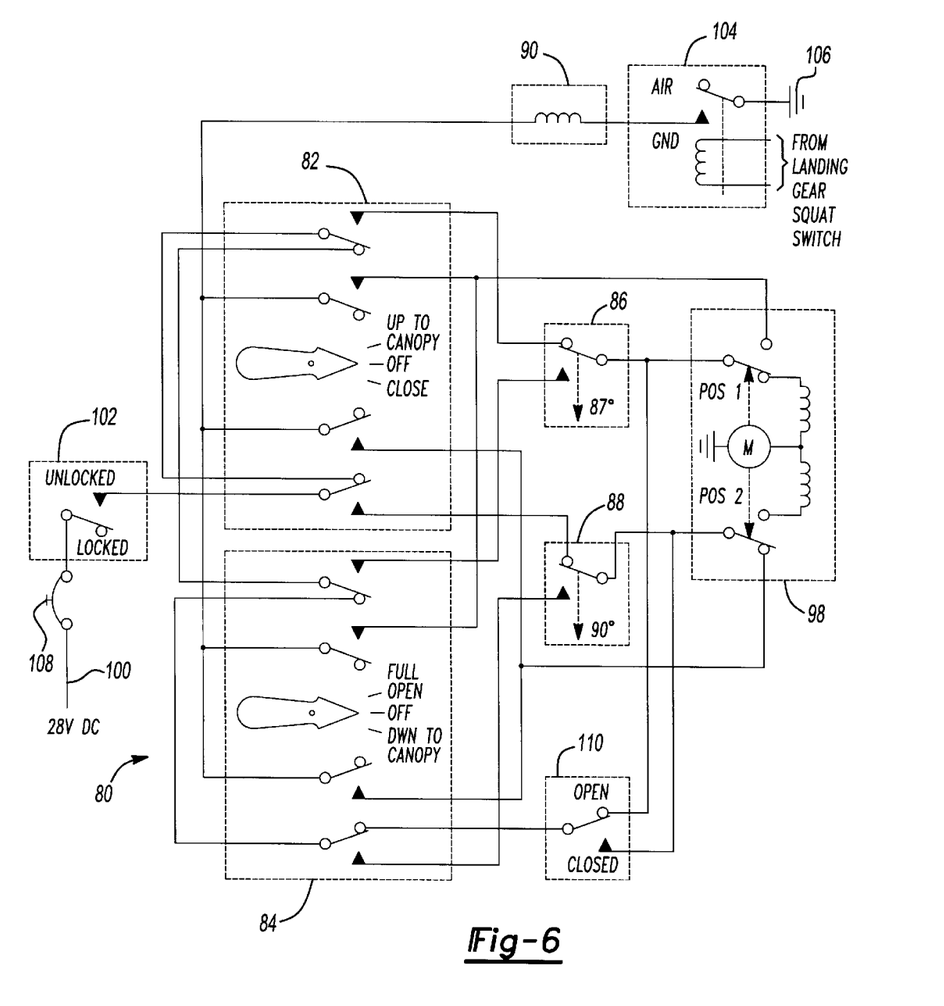
FIG. 6 is an electrical circuit diagram illustrating a cargo door electrical control circuit.
Figure 7:
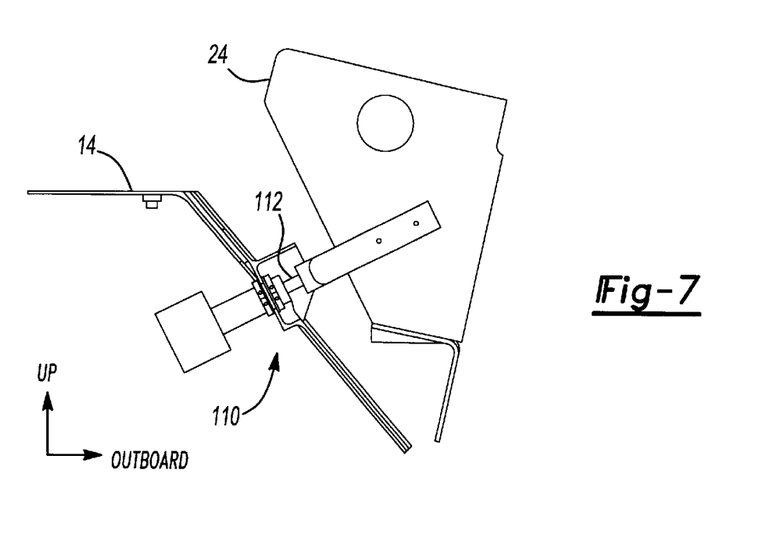
FIG. 7 is a side view illustrating a door closed switch installation.
Figure 8:
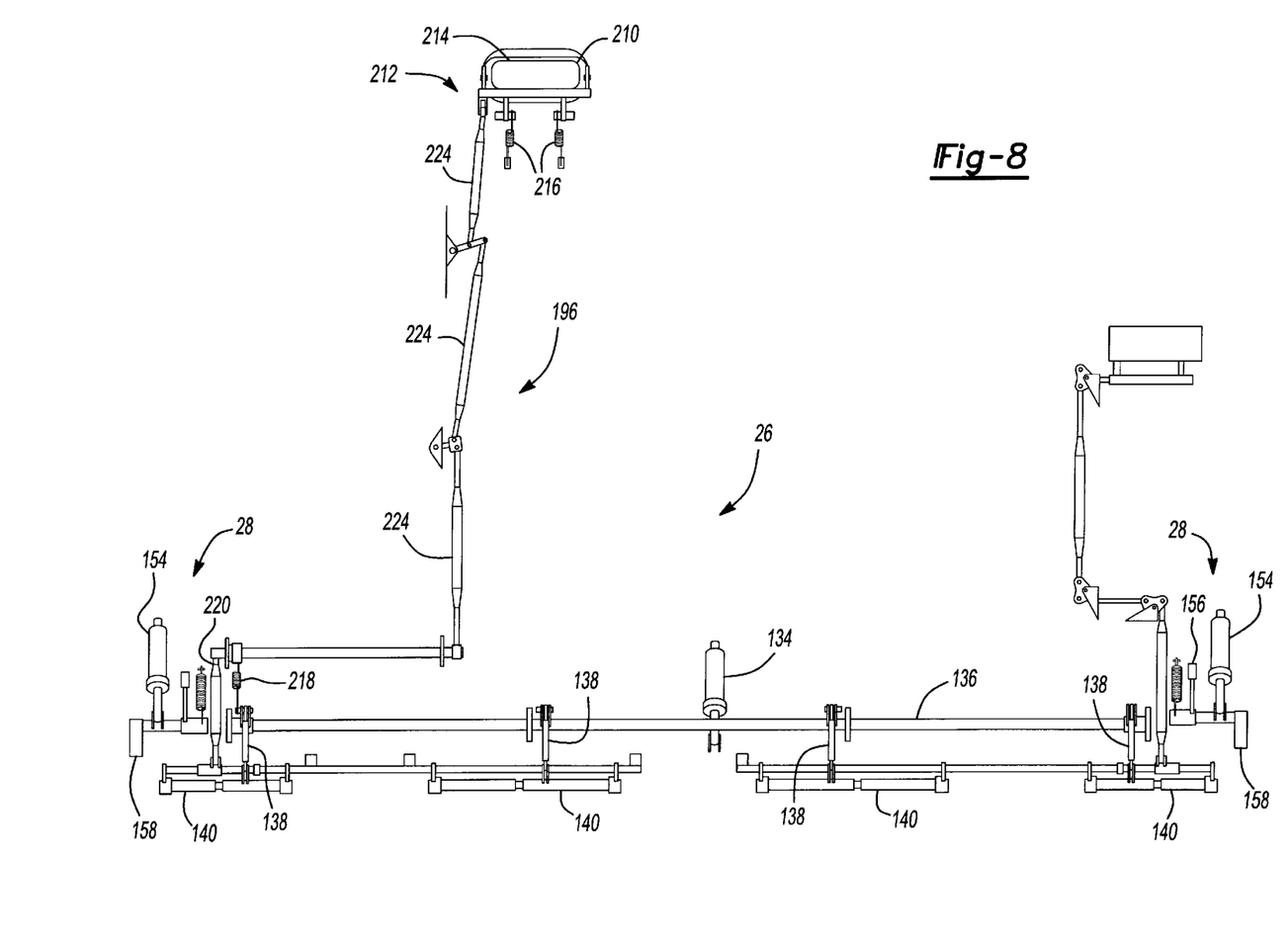
FIG. 8 is a partial perspective view illustrating a pull-in mechanism, a latching mechanism, and locking mechanism according to the present invention.
Figures 9A, 9B:
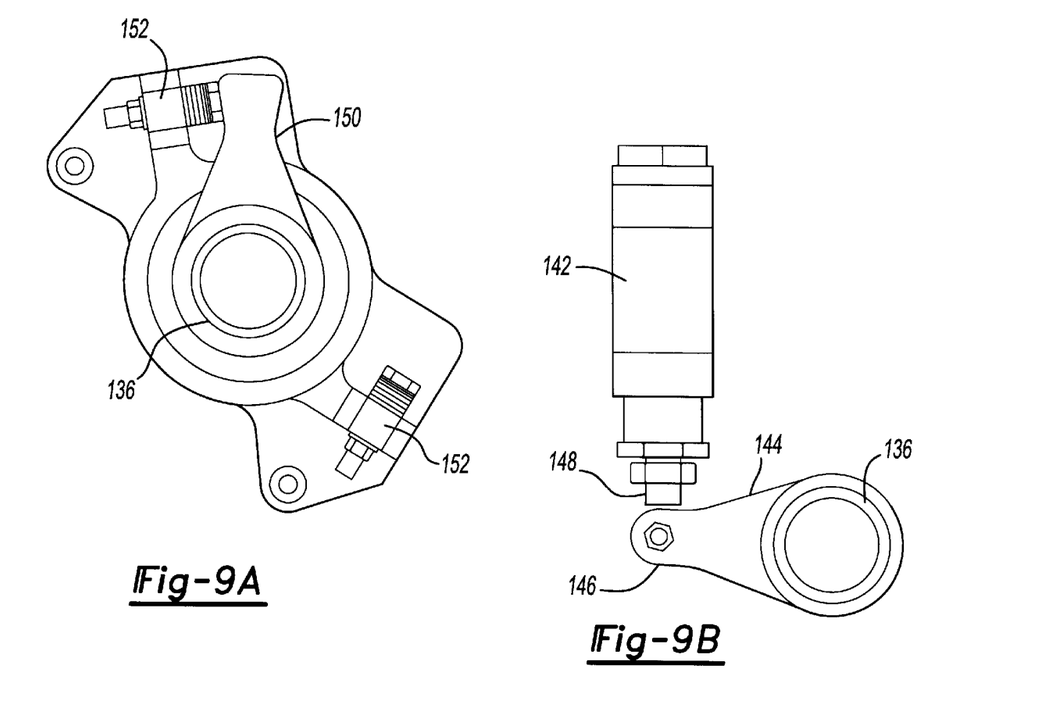
FIG. 9a is a side view illustrating latch torque tube limit stops.
FIG. 9b is a side view illustrating a latch sequence valve mechanism.
Figure 10:
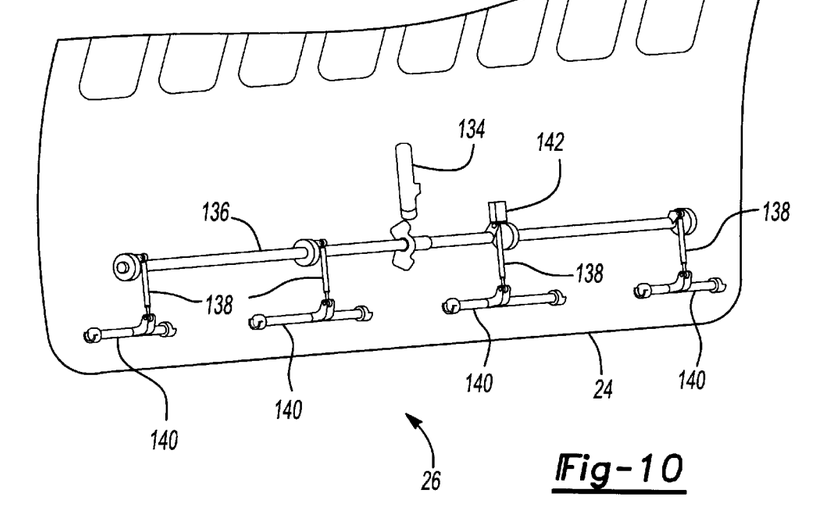
FIG. 10 is a perspective view illustrating a latching mechanism of the present invention.
Figure 11:
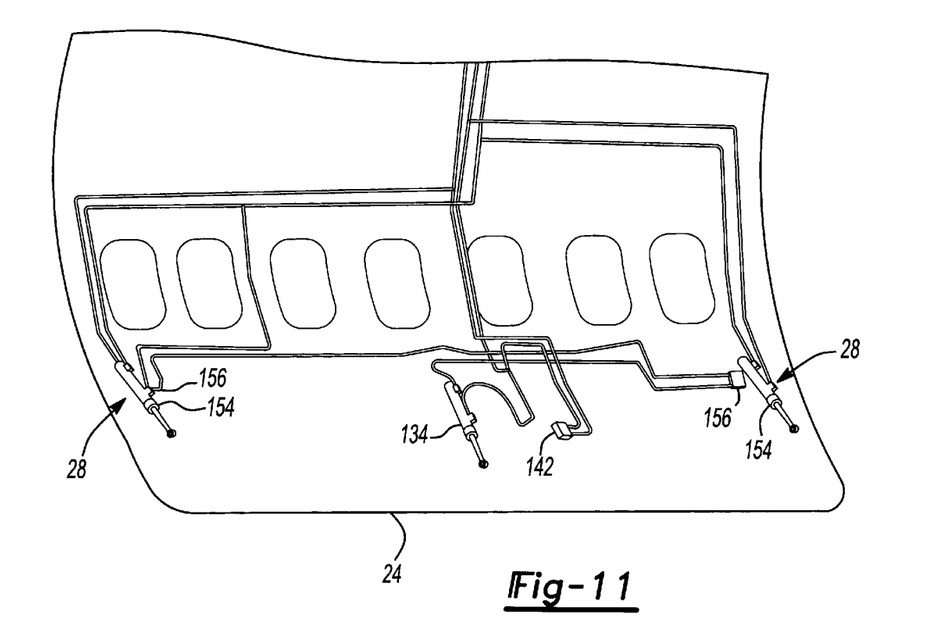
FIG. 11 is a perspective view illustrating the hydraulic components of the present invention.

Referring to FIGS. 6 and 7, a cargo door control panel 80 is disposed within airliner 12 and includes a first control switch 82 and a second control switch 84. Control switches 82, 84 are 3-position switches, which are each spring biased to a center OFF position. Control switches 82, 84 must be operated in sequence to raise cargo door 24 to the FULL OPEN position or to lower it from the FULL OPEN position. Specifically, first control switch 82 is held in the UP TO CANOPY position to unlatch and raise cargo door 24 to the canopy position. Cargo door 24 will automatically stop when the canopy position is reached (approximately 87°–88°). More particularly, a first canopy switch 86 is operably coupled with cargo door 24 to determine when cargo door 24 has opened to the canopy position. Thus, if first control switch 82 is held in the UP TO CANOPY position, cargo door 24 will continue to open until first canopy switch 86 is actuated.

Likewise, holding first control switch 82 to the CLOSE position causes cargo door 24 to close and latch from the canopy position. Similarly, second control switch 84 is used to raise cargo door 24 above the canopy position and to lower cargo door 24 to the canopy position when positioned to FULL OPEN or DOWN TO CANOPY, respectively. Further to this end, a second canopy switch 88 is provided to determine when cargo door 24 has reached an approximately 90° position. That is, second canopy switch 88 will automatically stop cargo door 24 when lowering cargo door 24 from a position above the canopy position (i.e., full open position). It should be appreciated that releasing either first control switch 82 or second control switch 84 will cause such switch to return to its spring-biased OFF position. If this occurs while cargo door 24 is being opened, cargo door 24 will hydraulically lock in the interim position as a result of the closure of an isolation valve 90. As best seen in FIG. 3, this hydraulic lock is provided by a check valve 92, a first relief valve 94, and a second relief valve 132. Upon further actuation of first control switch 82 or second control switch 84, cargo door 24 will continue to raise once isolation valve 90 hydraulically opens.

Similarly, releasing first control switch 82 or second control switch 84 while cargo door 24 is closing causes cargo door 24 to hydraulically lock in the interim position after automatic closure of isolation valve 90 and actuation of a control valve 98 to position POS 1 (FIG. 3). If first control switch 82 and second control switch 84 are operated again in the closing direction, cargo door 24 will continue to lower after control valve 98 moves to POS 2 and isolation valve 90 opens. As best seen in FIG. 3, control valve 98 is a four-way two-position control valve.

Power to cargo door control panel 80 and, thus, power input 100 is controlled to prevent inadvertent actuation of cargo door 24. Hence, an unlock switch 102 is provided that prevents actuation of cargo door control panel 80 and the associated mechanisms, if cargo door 24 is in a locked position, which causes unlock switch 102 to be in the LOCKED position. Furthermore, as seen in FIG. 6, an air/ground relay 104 must also indicate that airliner 12 is on the ground. More particularly, air/ground relay 104 is of conventional design, which generally incorporates a sensor in the landing gear system that detect the compression of the landing gear system while on the ground. Air/ground relay 104 prevents the inadvertent actuation of cargo door control panel 80 and, thus, the opening of cargo door 24 during flight. In operation, air/ground relay 104 prevents current flow to a ground element 106. A circuit breaker 108 is also provided between cargo door control panel 80 and power input 100.

As shown in FIGS. 6 and 7, a door closed switch 110, which is activated by a plunger 112 during opening/closing of cargo door 24, insures that control valve 98 remains in the last commanded closed or opened position when power input 100 is available to cargo door control panel 80. As shown in FIG. 3, a pressure switch 114 is used to indicate if isolation valve 90 is stuck in the opened position (flow from port 1 to port 2 is allowed) when power has been removed.

Hydraulic Pressure Control Circuit

As described above, cargo door actuation system 10 includes a four-way, two-position control valve 98. Preferably, control valve 98 is motor driven and manually over-rideable. Control valve 98 has two internal double pole switches, which are operated whenever control valve 98 is ported to POS 1 (door open) and POS 2 (door closed) (see FIG. 3). These internal double pole switches alternately close electrical circuits to each side of a split winding in the motor, thereby allowing the motor to drive control valve 98 to POS 1 or POS 2, depending on the last position of the internal switches. When control valve 98 moves to one extreme position, the switch connected to the driven winding is opened, thus automatically stopping the motor.

Still referring to FIG. 3, two ports of control valve 98, generally indicated as O and C, are connected to an open hydraulic passage 116 and a close hydraulic passage 118, respectively. Similarly, two other ports of control valve 98, generally indicated as P and R, are connected to a pressure supply 120 and a return circuit 122, respectively. Hydraulic pressure to the cargo door control system requires that a landing gear sequence valve 124 is in the landing gear DOWN position before hydraulic pressure is available to port 1 of an isolation valve 126. With electrical power applied to isolation valve 126, the rate of flow is controller by a flow limiter or restrictor 128 disposed on the pressure side of the hydraulic circuit and a flow limiter or restrictor 130 disposed on the return side of the hydraulic circuit. The flow rate capacity of restrictor 128 and restrictor 130 matches the area ratio of single lift actuator mechanism 30.

A relief valve 132, preferably having a capacity of about 3500 psi, is provided to prevent or at least minimize overpressurization and damage to cargo door actuation system 10. Two additional relief valves 94, 96 are further used. First relief valve 94 is fluidly coupled to the pressure port of manual pump 32. First relief valve 94, in conjunction with check valve 92 and relief valve 132, provides the hydraulic block for the pressure side of the hydraulic circuit. First relief valve 94 also prevents loss of the hydraulic fluid from the airplane reservoir, which is pressurized to a maximum of 65 psi, if a rupture occurs. Second relief valve 96 prevents cavitation of single lift actuator mechanism 30 caused by door weight during lowering of cargo door 24.

Latching Mechanisms

Referring now to FIGS. 3 and 8–11, cargo door actuation system 10 includes a latching mechanism 26. Latching mechanism 26 comprise a torque tube 136 that drives four push rods 138. Push rods 138 in turn drive four sets of dual latch cams 140. Latch actuator 134 accomplishes activation of latching mechanism 26. During the closing of cargo door 24, hydraulic power is prevented from activating latch actuator 134 in the latching direction until cargo door 24 is lowered completely by lift actuator 134 and is pulled into the fuselage door opening by the pair of pull-in actuators 154. Latch actuator 134 is arranged so that when pressure on both sides of the actuator piston is equal, the actuator provides a bias force to maintain the door in the latched position. Installed about a rod-end gland of latch actuator 134 is an absorption member, such as a felt ring, to absorb potential fluid leak past the internal rod end seals of latch actuator 134.

While opening cargo door 24, hydraulic pressure is provided to latch actuator 134 before pressure is supplied to either pull-in actuators 154 or lift actuator mechanism 30 via a latch cam sequence valve 142. Latch cam sequence valve 142 is a manually activated, spring-returned, two-position, two-way valve. Cargo door 24 must be fully unlatched before pressure is supplied to the pair of pull-in actuators 154 and single lift actuator mechanism 30. As torque tube 136 rotates, a crank 144 and a roller 146 (FIG. 9b), disposed on torque tube 136, cammingly engage and activates a plunger 148 of latch cam sequence valve 142. Rotation of torque tube 136 is limited by a lobe 150 (FIG. 9a) that contacts a pair of limit stops 152, which are mounted to structure of cargo door 24. When plunger 148 of latch cam sequence valve 142 is extended, pressure is blocked from flowing from port A to port B of latch cam sequence valve 142, but is free to flow from port B to port A. With plunger 148 of latch cam sequence valve 142 compressed (retracted), pressure is free to flow in either direction.

Pull-In Mechanism

With reference to FIGS. 3, 8, and 11–16, cargo door actuation system 10 further includes independent pull-in mechanisms 28. Pull-in mechanisms 28 provide the means to move cargo door 24 into and away from fuselage 14 during the last (or initial) degree of rotation. Pull-in mechanisms 28 each includes and independently activates its own pull-in cam sequence valve 156. In the interest of maximizing manufacturing efficiency, it is preferable that pull-in cam sequence valves 156 and latch cam sequence valve 142 are identical in construction and operation. Moreover, pull-in cam actuators 154 are preferably identical in construction and operation as latch actuator 134. Pull-in actuators 154 are arranged such that when pressure on both sides of the actuator piston is equalized, pull-in actuators 154 provide a bias force to maintain cargo door 24 in the respective pulled in and closed position.

As best seen in FIGS. 8, 13, 14, and 16 and with cargo door 24 in an opened position, a pair of pull-in hooks 158 is shown disposed on fore and aft sides of cargo door 24. Pull-in hooks 158 each pull cargo door 24 into the door opening during the last portion of door closing rotation. In this particular embodiment, pull-in hooks 158 pull cargo door 24 into the door opening during the last one degree of door rotation. Pull-in hooks 158 also accommodate deflection of fuselage 14, which may occur during loading. Pull-in hooks 158 are held against an open stop limit 160 (FIG. 13a) and a plunger 162 (FIG. 15) of pull-in cam sequence valve 156 are extended to prevent hydraulic fluid flow from port A to port B of pull-in cam sequence valve 156 (FIG. 3). Even though closing pressure is applied to pull-in actuators 154, extension of pull-in actuators 154 is prevented by the open stop limit 160 and an overcenter spring assembly 164. That is, pull-in hooks 158 and pull-in actuators 154 are in a slight overcenter condition in the opening direction, while pull-in hooks 158 are in contact with open stop limit 160. In this position, plungers 162 of pull-in cam sequence valves 156 are also extended. This extension prevents hydraulic pressure from actuating latch actuator 134.

Figures 15, 16:
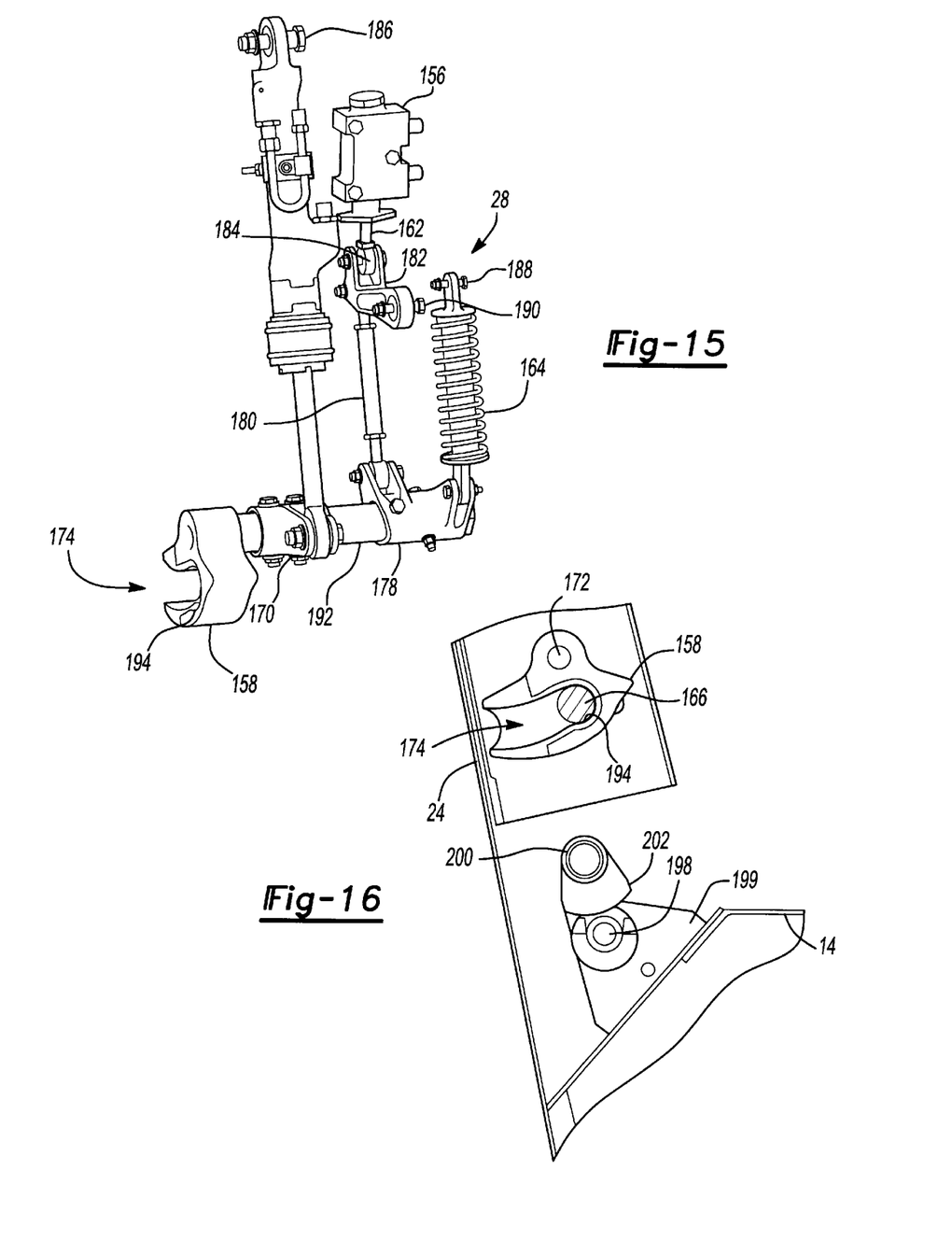
FIG. 15 is a perspective view of the pull-in mechanism.
FIG. 16 is a side view of the pull-in hook of the pull-in mechanism in a cammed position, the latching mechanism in a latched position, and the lock mechanism in the locked position.

During the last moments of door closing (lowering), the outboard face 166 of pull-in hooks 158 contact a corresponding pull-in roller 168, which extends from the edge frame of the door opening of fuselage 14. This contact moves a pull-in hook crank 170 and pull-in actuators 154 from a blocked slight overcenter condition in the open direction to overcenter in the closing direction. As pull-in actuators 154 extend, pull-in hooks 158 rotate about a pivot 172, thereby entrapping pull-in roller 168 within a camming slot 174 of each pull-in hook 158. This rotation of pull-in hooks 158 continues until cargo door 24 is pulled into the door opening in fuselage 14 and pull-in hooks 158 each contact a closed stop limit 176. During the last portion of pull-in actuators 154 extension, plungers 162 of pull-in cam sequence valves 156 are compressed, which then allow pressure to flow to latch actuator 134. Specifically, plungers 162 are each compressed by a mechanism consisting of a lower crank arm 178, a push rod 180, an upper crank arm 182, and a follower roller 184 (FIG. 15). It should be noted, as illustrated in FIG. 15, that ends 186, 188, and 190 of pull-in actuators 154, upper crank arm 182, and overcenter spring assembly 164, respectively, are each fixedly coupled to the structure of cargo door 24. Moreover, lower crank arm 178, pull-in hook crank 170, and pull-in hooks 158 are fixedly mounted for rotation with an axially-fixed, rotatable member 192.

Once cargo door 24 is fully closed and pulled-in, pull-in rollers 168 are positioned in a detent 194 formed in outboard face 166 of pull-in hooks 158. Detents 194, in combination with pull-in cam actuators 154 hydraulically blocked and biased in the overcenter position and overcenter spring assembly 164 in the overcenter door-pulled-in direction, provide a jam condition that prevents cargo door 24 from opening by cabin and external pressure loads. This is true, even if cargo door 24 is not latched and locked.

When cargo door 24 is closed, but not latched and locked, pulling mechanisms 28 are capable of maintaining cargo door 24 closed against the cabin-to-ambient differential pressure corresponding to the maximum inflow rate of the A/C pacts limited by an open vent panel assembly 214. Hydraulic locking of pull-in actuators 154, the forces attributed to overcenter spring assembly 164, and detents 194 of pull-in hooks 158 provide the reaction loads required to maintain cargo door 24 closed and in the pulled-in position. Additionally, each pull-in mechanism 28 is relieved of carrying loads (hoop tension and body shear) when cargo door 24 is latched by latching mechanism 26.

LockingVent Panel Mechanism

Referring to FIGS. 8, 12, 14, and 16, cargo door actuation system 10 still further includes a locking and venting mechanism 196. Locking and venting mechanism 196 provides a means to verify that latching mechanism 26 is in the latched position, prevents inadvertent unlatching of latching mechanism 26 by means of a mechanical lock, and closes a vent panel 210 to permit pressurization of the airplane. Locking and venting mechanism 196 also provides visual indication to the ground crew that cargo door 24 is either locked or unlocked, enables or disables electrical power to the door control system, and operates the door LOCKED indication system.

Locking and venting mechanism 196 is disposed along a lower edge of cargo door 24. In a locked condition, dual latch cams 140 are trapped around corresponding latch pins 198, which are fixed to structure of fuselage 14 via brackets 199. Locking and venting mechanism 196 comprises a lock torque tube 200 and a lock sector 202 for each dual latch cam 140 that is manually operated by a door handle. A mechanical catch (not shown) holds the manual door handle in a locked position. It is not possible to lock cargo door 24 and secure the manual door handle unless cargo door 24 is fully closed and latched. If cargo door 24 is not fully latched, dual latch cams 140 interfere with lock sectors 202 and prevent rotation of lock torque tube 200 in the locked direction. At the opposite end of lock torque tube 200, a vent panel mechanism 212 is attached. Vent panel mechanism 212 provides the means to limit pressurization of the main deck compartment when cargo door 24 is not fully closed, latched, or locked. Vent panel mechanism 212 includes a vent panel assembly 214, two bias helical extension springs 216, a crank assist helical extension spring 218, a torque shaft assembly 220, idler cranks 222, and pushrods 224. When the lock handle mechanism is moved to the unlock position, vent panel assembly 214 opens (rotates) inward approximately 40 degrees.

If cargo door 24 can not be locked, vent panel mechanism 212 remains open to limit cabin pressure to a safe level below that which pull-in hooks 158 and pull-in rollers 168 can withstand. Should a failure occur in the linkage between vent panel mechanism 212 and the manual door handle, three springs will automatically unlock cargo door 24 once the cabin pressure is reduced below the level that pull-in hooks 158 and pull-in rollers 168 can withstand. Subsequent dispatch of airliner 12 is thus prevented until cargo door 24 is fixed.

Figure 12:
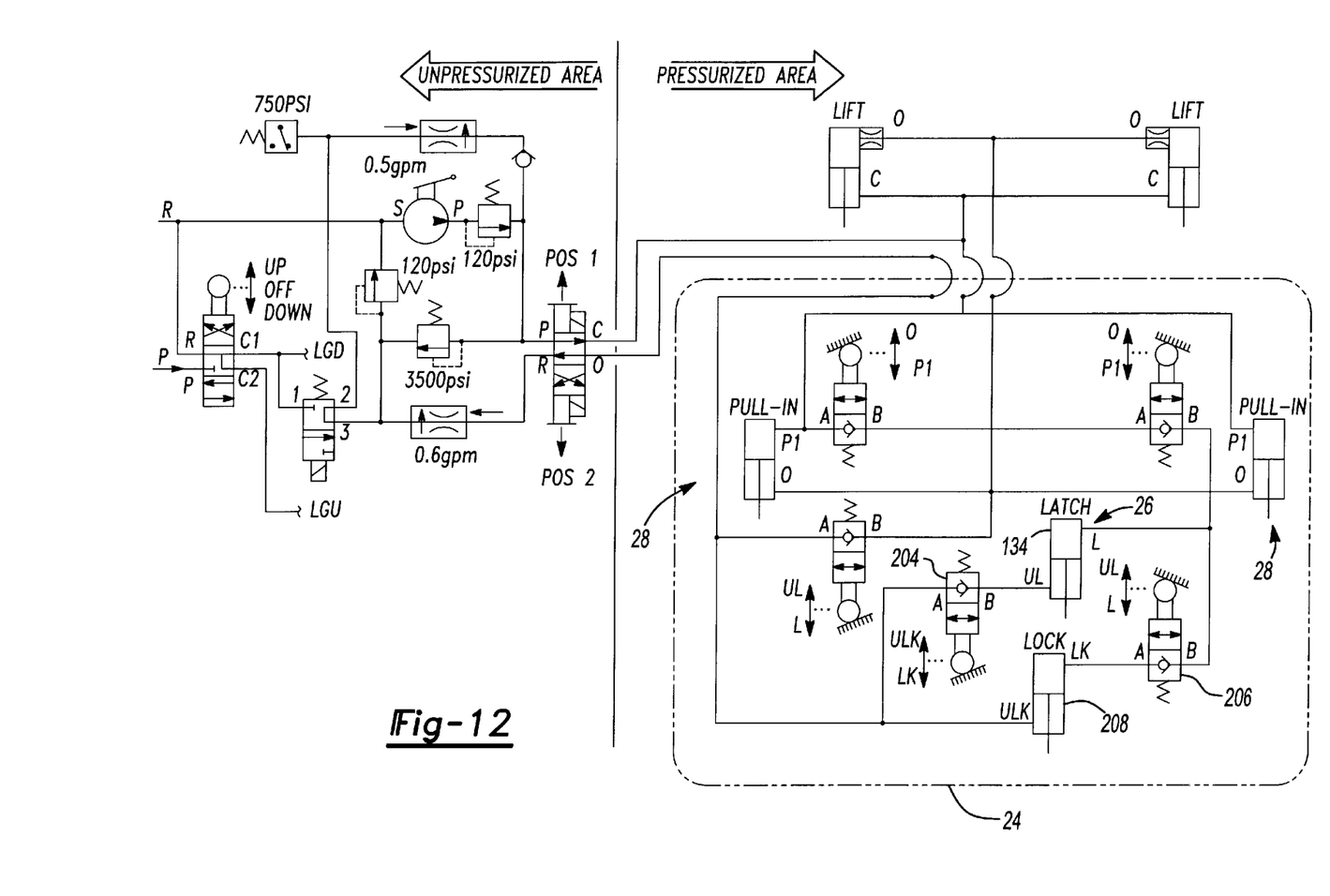
FIG. 12 is a fluid circuit diagram illustrating the door actuation system according to a second embodiment of the present invention.
Figure 13A:
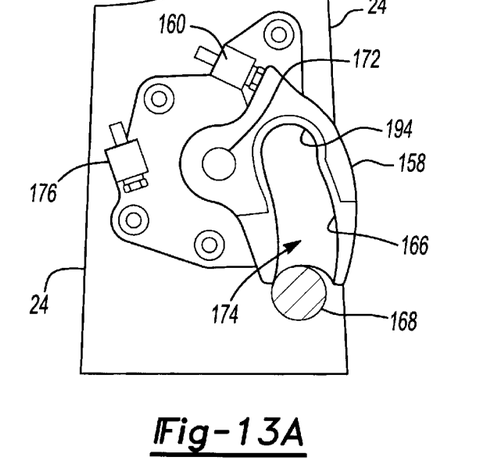
FIG. 13a is a side view of the pull-in hook of the pull-in mechanism in an uncammed position.
Figure 13B:
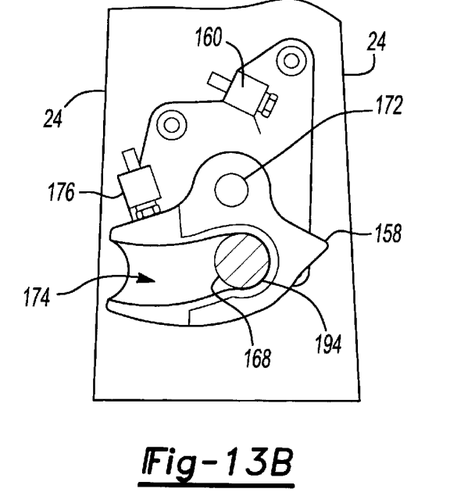
FIG. 13b is a side view of the pull-in hook of the pull-in mechanism in a cammed position.
Figure 14:
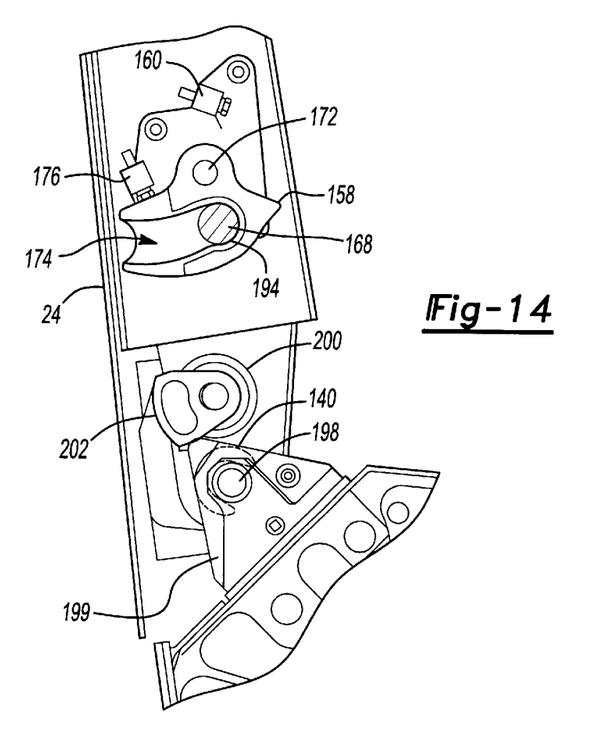
FIG. 14 is a side view of the pull-in hook of the pull-in mechanism in a cammed position and latching mechanism in an unlatched position.

Briefly, as seen in FIG. 12, it is possible to have cargo door 24 hydraulically locked rather than manually. This is accomplished by the simple application of two additional sequence valves 204, 206 and an additional lock actuator 208. Unlatched sequence valve 204 and locked sequence valve 206 are identical in construction and operation to pull-in cam sequence valve 156 and latch sequence valve 142. Lock actuator 208 may be identical to pull-in actuators 154 and lift actuator mechanism 30, but more preferably is considerably smaller due to lower force requirements for the locking function.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A door actuation system for an outwardly opening door in an aircraft, said aircraft having a door opening, a cam post coupled to and extending from said aircraft adjacent said door opening, and a plurality of latch pins coupled to and extending from said aircraft, said system comprising:

a door pivotally connectable to the aircraft for selectively covering the door opening;

a locking mechanism operably coupled to said door, said locking mechanism positionable in a locked position preventing said door from being opened and an unlocked position;

a pull-in mechanism operably coupled to said door, said pull-in mechanism being hydraulically actuated and having a rotatable cam slot member, said rotatable cam slot member selectively engaging the cam post extending from said aircraft, said pull-in mechanism being positionable in an uncammed position where said cam slot member is disengaged from the cam post and a cammed position where said cam slot member substantially engages the cam post to pull said door into a fully closed position, said pull-in mechanism having:

a hydraulic actuator mounted on a first end to said door;

a rotatable member supporting said cam slot member for rotation about an axis;

a crank member fixedly coupled to said rotatable member and pivotally coupled to a second end of said hydraulic actuator, said crank member transferring a linear force from said hydraulic actuator to a rotational force in said hook member to rotate said cam slot member; and an overcenter spring mechanism operably coupled to said rotatable member resisting positional change between said cammed and uncammed positions; and a latching mechanism operably coupled to said door, said latching mechanism being hydraulically actuated and having a plurality of cam latches, each of said plurality of cam latches selectively receiving one of the plurality of latch pins extending from said aircraft, said latching mechanism being positionable in a latched position where said plurality of cam latches engage the plurality of latch pins to latch said door in said fully closed position and an unlatched position where said door is free to be opened, said pull-in mechanism and said latching mechanism being capable of preventing opening of said door when said pull-in mechanism is in said cammed position and said latching mechanism is in said latched position, even if said locking mechanism is in said unlocked position.

2. The door actuation system according to claim 1 wherein said overcenter spring mechanism comprises:

a spring member fixed at a first end to said door; and a crank arm fixedly coupled to said rotatable member for rotation therewith and pivotally coupled to a second end of said spring member, said spring member and said crank arm cooperating to resist rotation of said rotatable member.

3. The door actuation system according to claim 2 wherein said latching mechanism comprises:

a torque-transferring member rotatably supported in said door;

a locking actuator mounted on a first end to said door;

an actuator bracket fixedly coupled to said torque transferring member and pivotally coupled to a second end of said locking actuator, said actuator bracket transferring a linear force from said locking actuator to a rotational force in said torque transferring member to rotate said torque transferring member; and a plurality of push rods interconnect said torque transferring member and said plurality of cam latches, said plurality of push rods each rotate said plurality of cam latches between said latched and unlatched positions.

4. The door actuation system according to claim 3, further comprising:

a mechanically actuated pull-in sequence valve operably coupled to said pull-in mechanism, said pull-in sequence valve being positionable in a first position to prevent hydraulic fluid flow to said latching mechanism to prevent positioning of said latching mechanism in said latched position until said pull-in mechanism is in said cammed position, said pull-in sequence valve further being positionable in a second position to permit hydraulic fluid flow to said latching mechanism.

5. The door actuation system according to claim 4, further comprising:

a mechanically actuated latching sequence valve operably coupled to said latching mechanism, said latching sequence valve being positionable in a first position to prevent hydraulic fluid flow to a door lifting mechanism to prevent opening of said door until said latching mechanism is in said unlatched position.

6. A door actuation system for an outwardly opening door in an aircraft, said aircraft having a door opening, a cam post coupled to and extending from said aircraft adjacent said door opening, and a plurality of latch pins coupled to and extending from said aircraft, said system comprising:

a door pivotally connectable to the aircraft for selectively covering the door opening;

a locking mechanism operably coupled to said door, said locking mechanism positionable in a locked position preventing said door from being opened and an unlocked position;

a pull-in mechanism operably coupled to said door, said pull-in mechanism being hydraulically actuated and having a cam slot member, said cam slot member selectively engaging the cam post of said aircraft extending from said aircraft, said pull-in mechanism being positionable in an uncammed position where said cam slot member is disengaged from the cam post and a cammed position where said cam slot member substantially engages the cam post to pull said door into a fully closed position, said pull-in mechanism having:

a hydraulic actuator mounted on a first end to said door;

a rotatable member supporting said cam slot member for rotation about an axis;

a crank member fixedly coupled to said rotatable member and pivotally coupled to a second end of said hydraulic actuator, said crank member transferring a linear force from said hydraulic actuator to a rotational force in said hook member to rotate said cam slot member; and an overcenter spring mechanism operably coupled to said rotatable member resisting positional change between said cammed and uncammed positions;

a latching mechanism operably coupled to said door, said latching mechanism being hydraulically actuated and having a plurality of cam latches, each of said plurality of cam latches selectively receiving one of the plurality of latch pins, said latching mechanism being positionable in a latched position where said plurality of cam latches engage the plurality of latch pins to latch said door in said fully closed position and an unlatched position where said door is free to be opened; and a mechanically actuated sequencing valve operably coupled to at least one of said pull-in mechanism and said latching mechanism, said mechanically actuated sequencing valve preventing actuation of said latching mechanism until said mechanically actuated sequencing valve is positioned in a fluid flow position, said pull-in mechanism and said latching mechanism being capable of preventing opening of said door when said pull-in mechanism is in said cammed position and said latching mechanism is in said latched position, even if said locking mechanism is in said unlocked position.

7. The door actuation system according to claim 6 wherein said overcenter spring mechanism comprises:

a spring member fixed at a first end to said door;

a crank arm fixedly coupled to said rotatable member for rotation therewith and pivotally coupled to a second end of said spring member, said spring member and said crank arm cooperating to resist rotation of said rotatable member.

8. The door actuation system according to claim 7 wherein said latching mechanism comprises:

a torque-transferring member rotatably supported in said door;

a locking actuator mounted on a first end to said door;

an actuator bracket fixedly coupled to said torque transferring member and pivotally coupled to a second end of said locking actuator, said actuator bracket transferring a linear force from said locking actuator to a rotational force in said torque transferring member to rotate said torque transferring member;

a plurality of push rods interconnect said torque transferring member and said plurality of cam latches, said plurality of push rods each rotate said plurality of cam latches between said latched and unlatched positions.

9. The door actuation system according to claim 6 wherein said mechanically actuated sequencing valve is operably coupled to said pull-in mechanism, said mechanically actuated sequencing valve being positionable in a first position to prevent hydraulic fluid flow to said latching mechanism to prevent positioning of said latching mechanism in said latched position until said pull-in mechanism is in said cammed position, said mechanically actuated sequencing valve further being posionable in a second position to permit hydraulic fluid flow to said latching mechanism.

10. The door actuation system according to claim 8 wherein said mechanically actuated sequencing valve is operably coupled to said latching mechanism, said mechanically actuated sequencing valve being positionable in a first position to prevent hydraulic fluid flow to a door lifting mechanism to prevent opening of said door until said latching mechanism is in said unlatched position.

* * * * *